United States Patent
Kimura

(10) Patent No.: US 11,066,024 B2
(45) Date of Patent: Jul. 20, 2021

(54) GROMMET ASSEMBLY

(71) Applicant: Yazaki Corporation, Tokyo (JP)

(72) Inventor: Akitoshi Kimura, Toyota (JP)

(73) Assignee: YAZAKI CORPORATION, Tokyo (JP)

( * ) Notice: Subject to any disclaimer, the term of this patent is extended or adjusted under 35 U.S.C. 154(b) by 148 days.

(21) Appl. No.: 16/534,408

(22) Filed: Aug. 7, 2019

(65) Prior Publication Data
US 2020/0070751 A1 Mar. 5, 2020

(30) Foreign Application Priority Data

Aug. 30, 2018 (JP) .............................. JP2018-161970

(51) Int. Cl.
| | |
|---|---|
| *H02G 3/22* | (2006.01) |
| *B60R 16/02* | (2006.01) |
| *H01B 17/58* | (2006.01) |
| *F16L 5/02* | (2006.01) |

(52) U.S. Cl.
CPC ....... *B60R 16/0222* (2013.01); *H01B 17/583* (2013.01); *H02G 3/22* (2013.01); *F16L 5/02* (2013.01)

(58) Field of Classification Search
CPC .. H02G 3/22; H02G 3/24; H02G 3/26; H02G 3/06; H02G 3/04; H02G 3/30; H02G 3/36; B60R 16/08; B60R 16/0207; B60R 16/0215; H01B 17/56; H01B 17/583; F16L 5/00; F16L 5/02

USPC ....... 174/152 G, 153 G, 72 A, 163 R, 166 R, 174/72 R, 659, 142, 152 R, 153 R; 16/2.1, 2.2; 439/271, 272; 248/56

See application file for complete search history.

(56) References Cited

U.S. PATENT DOCUMENTS

| | | | | |
|---|---|---|---|---|
| 5,337,447 | A * | 8/1994 | Tanaka ................... | H02G 3/083 16/2.2 |
| 7,020,931 | B1 * | 4/2006 | Burnett ............... | B60R 16/0222 16/2.1 |
| 7,418,765 | B2 * | 9/2008 | Kameyama ......... | B60R 16/0222 16/2.1 |

(Continued)

FOREIGN PATENT DOCUMENTS

| | | |
|---|---|---|
| JP | 6-15274 U | 2/1994 |
| JP | 2007-189839 A | 7/2007 |

(Continued)

*Primary Examiner* — Angel R Estrada
(74) *Attorney, Agent, or Firm* — Sughrue Mion, PLLC

(57) ABSTRACT

A grommet assembly includes an inner member having a body portion to be inserted into a mounting hole of a panel, and a panel engagement portion formed on the body portion and to be engaged with an opening edge of the mounting hole, a grommet to be mounted to a rear side of the inner member, the grommet including an annular panel contact portion having a seal part to contact a portion of the panel surrounding the mounting hole, and a tubular wire housing portion connected to the panel contact portion and to cover an electric wire such that the electric wire bends with respect to a center axis of the mounting hole and a protruding member to protrude from a rear side of the body portion, the protruding member including a pressing support portion extending along an inner surface of a rear wall of the wire housing portion.

2 Claims, 15 Drawing Sheets

(56) References Cited

U.S. PATENT DOCUMENTS

| | | | | |
|---|---|---|---|---|
| 7,423,223 | B2 * | 9/2008 | Taira | B60S 1/48 |
| | | | | 16/2.1 |
| 7,943,854 | B1 * | 5/2011 | Lipp | H02G 3/0468 |
| | | | | 174/152 G |
| 8,925,147 | B2 * | 1/2015 | Furuta | B60R 16/0222 |
| | | | | 16/2.1 |
| 10,569,725 | B2 * | 2/2020 | Ogawa | B60R 16/0222 |
| 10,899,294 | B2 * | 1/2021 | Kimura | B60R 16/0222 |
| 10,913,407 | B2 * | 2/2021 | Baydoun | B60R 16/0222 |
| 2017/0201038 | A1 | 7/2017 | Watai et al. | |

FOREIGN PATENT DOCUMENTS

| | | | |
|---|---|---|---|
| JP | 2013038899 A | * | 2/2013 |
| JP | 2017-123288 A | | 7/2017 |

* cited by examiner

GROMMET ASSEMBLY

CROSS-REFERENCE TO RELATED APPLICATION

The present application claims priority to Japanese Patent Application No. 2018-161970 filed on Aug. 30, 2018, the entire content of which is incorporated herein by reference.

TECHNICAL FIELD

The present invention relates to a grommet assembly.

BACKGROUND ART

A electric wire bundle (electric wires) routed between a vehicle body and a door in a vehicle such as an automobile is passed through a flexible grommet, so as to be protected and to ensure waterproof property (see, e.g., JPH06-15274U, JP2007-189839A, and JP2017-123288A).

A related art grommet assembly includes a connector (an example of an inner member) and a grommet attached to a rear portion of the connector (see, e.g., JPH06-15274U). The connector includes a panel engagement portion configured to be engaged with an opening edge of a mounting hole formed in a panel of a vehicle and an annular flange portion configured to face a portion of the panel surrounding the mounting hole. The panel engagement portion and the annular flange portion are respectively formed on the outside of the connector. The grommet includes a tubular wire housing portion covering the electric wire bundle, and a panel contact portion fitted so as to cover the flange portion and be in contact with the portion of the panel surrounding the mounting hole. The grommet assembly is attached to the panel of the vehicle in a state where a seal part of the panel contact portion is in tight contact with a surface of the portion of the panel surrounding the mounting hole by locking the panel engagement portion of the connector to the opening edge of the mounting hole.

Depending on the shape of the panel at a mounting position of the vehicle, a mounting space may be narrow and there is not a space for an operator's hand to get in around the grommet assembly. When attaching the grommet assembly to the panel, in order to lock the panel engagement portion to the opening edge of the mounting hole, it is necessary to press the panel contact portion of the grommet, which is a press surface, with a finger, but if there is no space around the grommet assembly, the panel contact portion cannot be pressed with a finger, and it may be difficult to mount the grommet. Since the grommet is made of an elastic material such as rubber, the grommet will be elastically deformed even if a ceiling of the wire housing portion is pressed. Therefore, even if the ceiling of the wire housing portion is pressed, the pressing force may not be sufficiently transmitted to the panel contact portion, in which case the panel engagement portion of the connector cannot be properly locked to the opening edge of the mounting hole.

If the panel engagement portion of the connector is not properly locked to the opening edge of the mounting hole, the seal part of the panel contact portion of the grommet may not be in tight contact with the surface of the panel, and the seal property may be degraded. The grommet assembly, in which the panel engagement portion of the connector is not properly locked to the opening edge of the mounting hole, may come off from the mounting hole of the panel due to vibration or the like when the vehicle travels.

SUMMARY

Illustrative aspects of the present invention provide a grommet assembly which can be easily mounted to a panel regardless of the shape of the panel of a mounting position.

According to an illustrative aspect of the invention, a grommet assembly includes an inner member that includes a body portion to be inserted into a mounting hole of a panel, and a panel engagement portion formed on the body portion and configured to be engaged with an opening edge of the mounting hole, a grommet that is configured to be mounted to a rear side of the inner member, the grommet including an annular panel contact portion having a seal part configured to contact a surface of a portion of the panel surrounding the mounting hole, and a tubular wire housing portion connected to the panel contact portion and configured to cover an electric wire such that the electric wire is bent with respect to a center axis of the mounting hole and a protruding member that is provided to protrude from a rear side of the body portion, the protruding member including a pressing support portion extending along an inner surface of a rear wall of the wire housing portion.

Other aspects and advantages of the invention will be apparent from the following description, the drawings and the claims.

DESCRIPTION OF EMBODIMENTS

Figure 1:
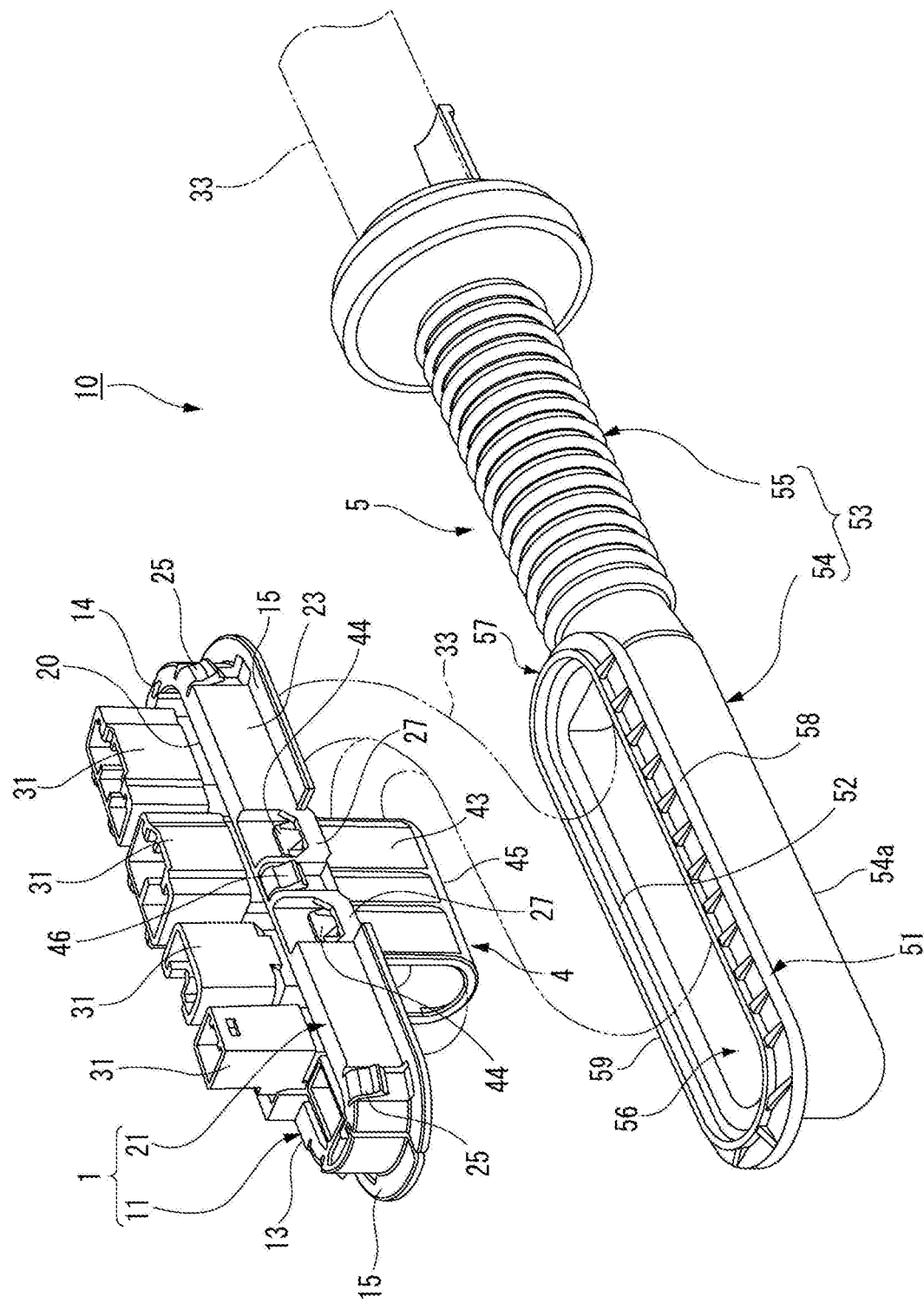
FIG. 1 is an exploded perspective view of a grommet assembly according to a first embodiment of the present invention.
Figure 2:
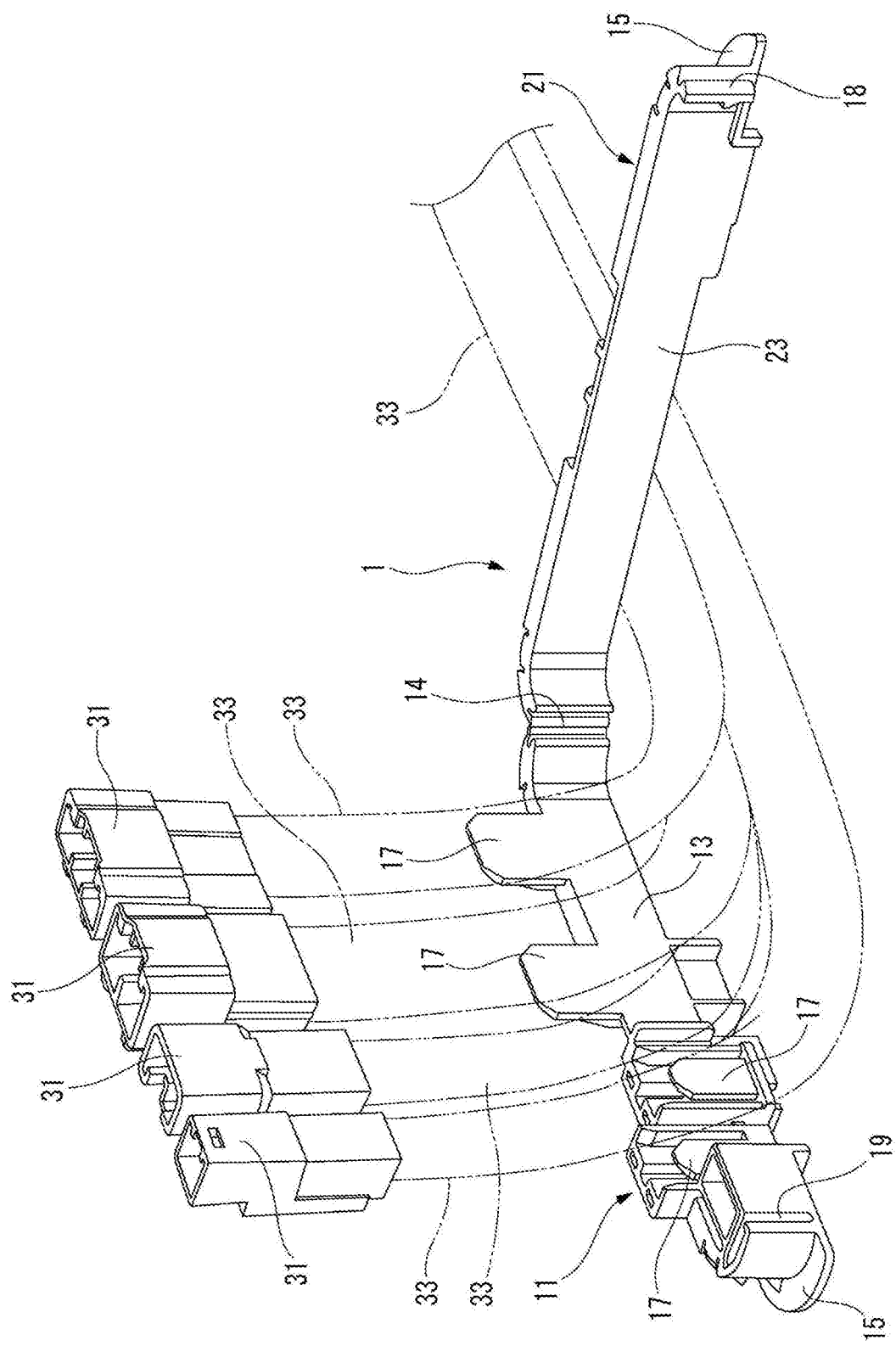
FIG. 2 is a perspective view showing an inner member shown in FIG. 1 during assembly.
Figure 3:
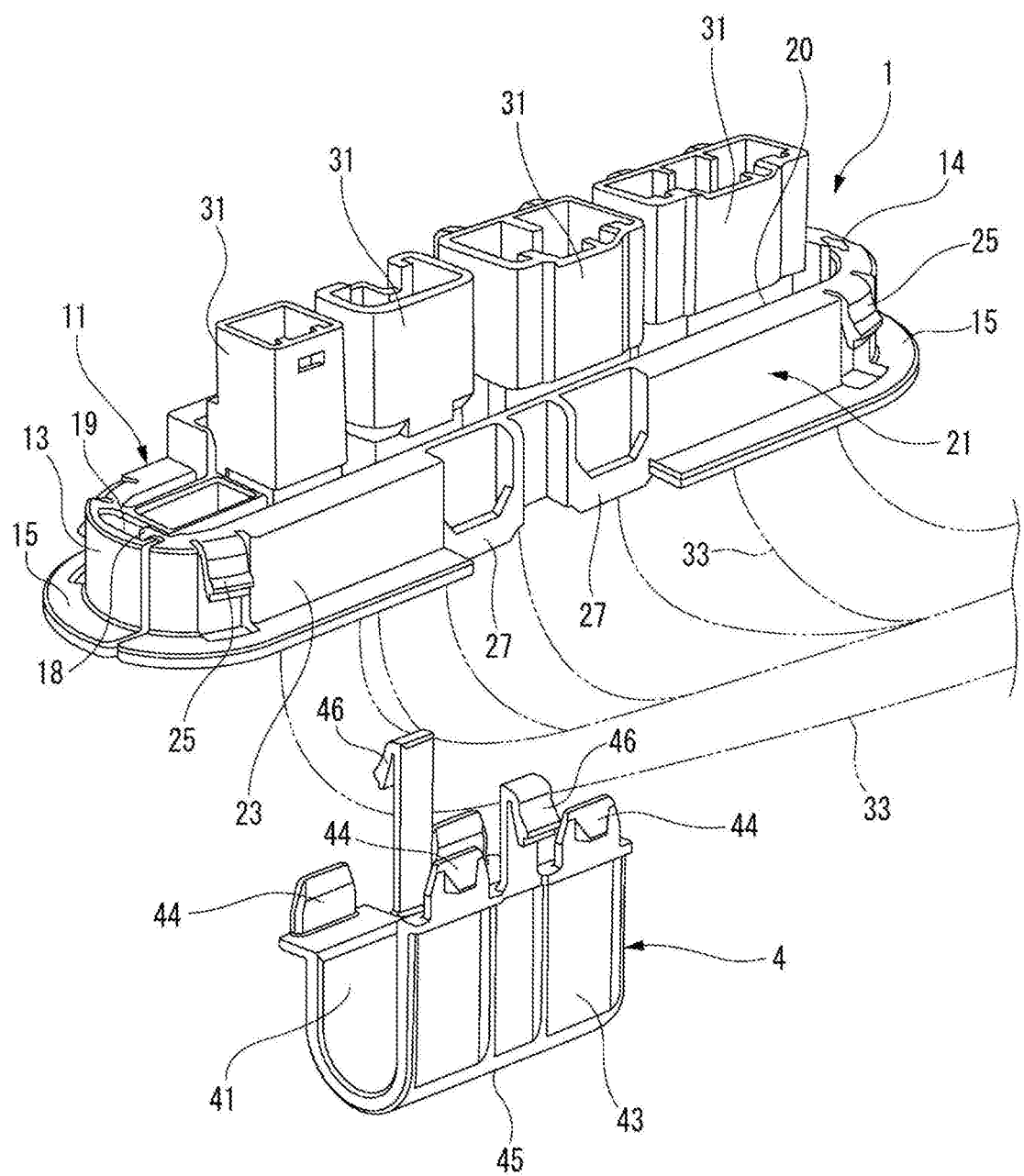
FIG. 3 is an exploded perspective view of the inner member and a protruding member shown in FIG. 2.
Figure 4:
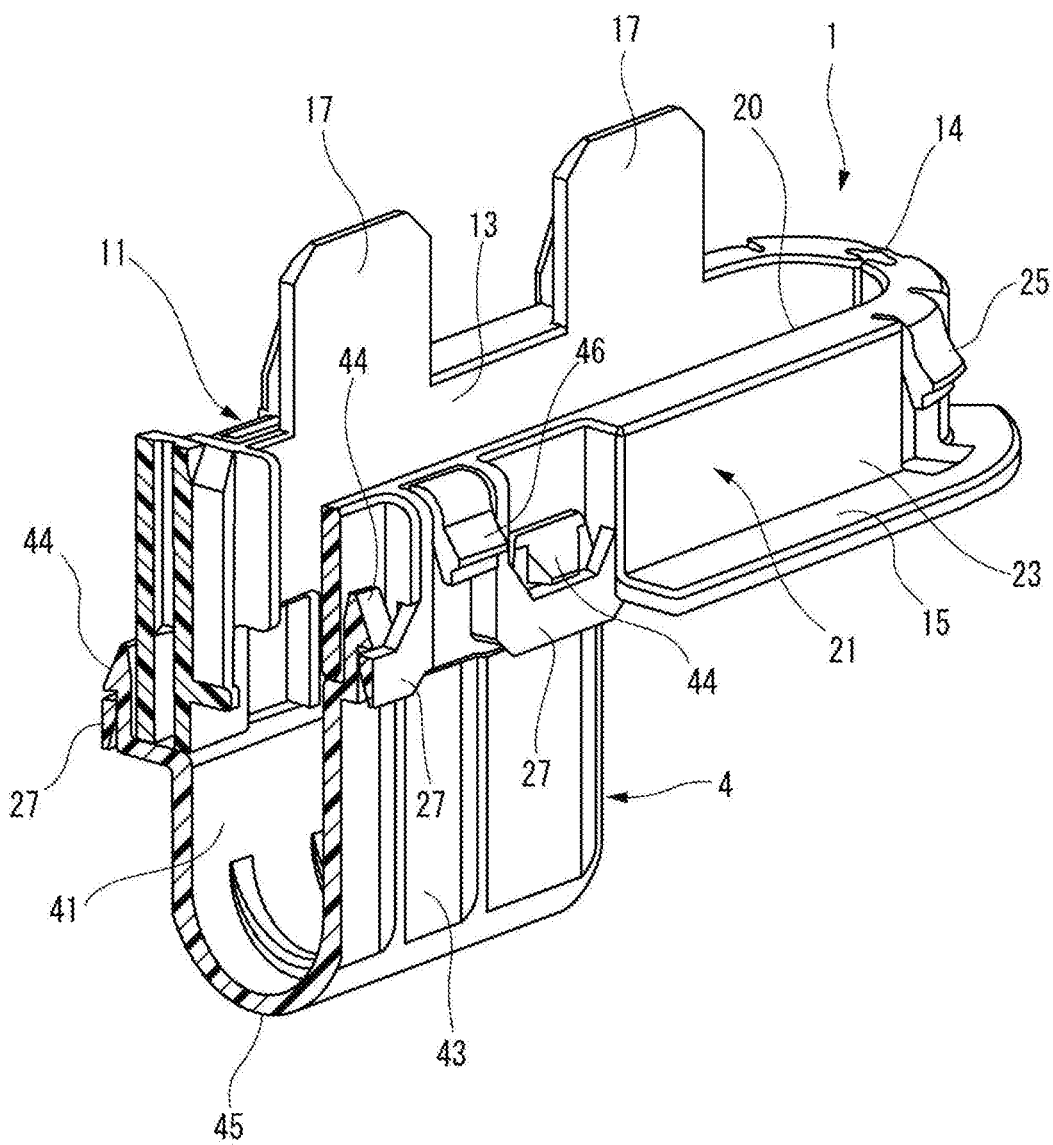
FIG. 4 is a sectional view of main parts in a state where the inner member and the protruding member shown in FIG. 3 are assembled.
Figure 5A:
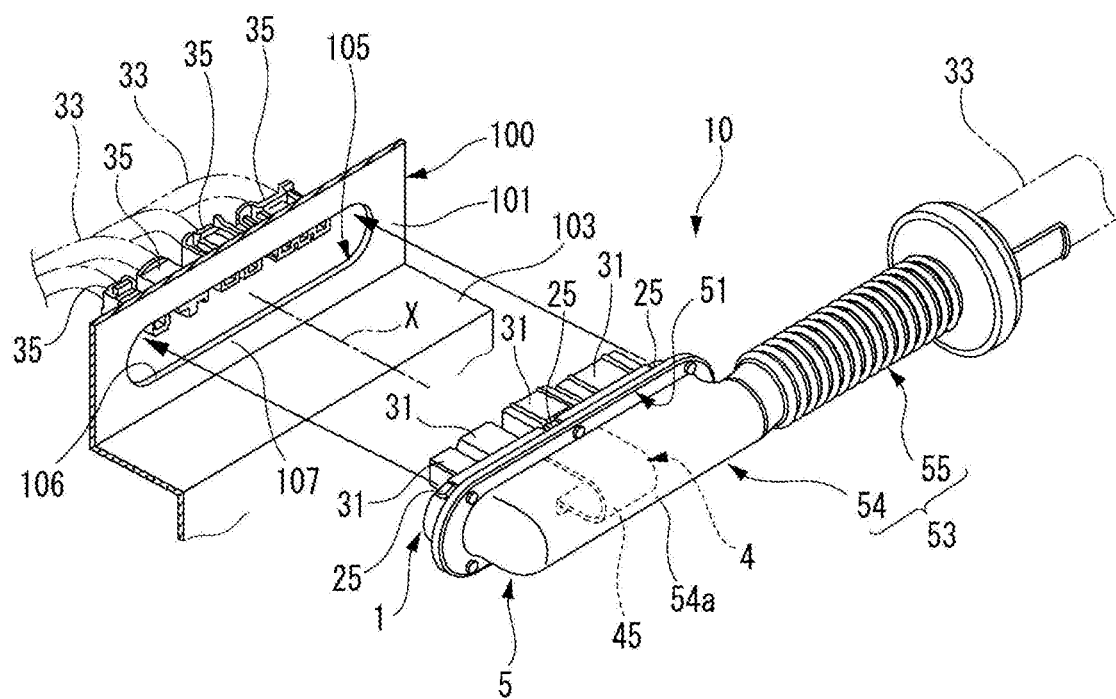
FIG. 5A is a perspective view of the grommet assembly before being mounted to the panel.
Figure 5B:
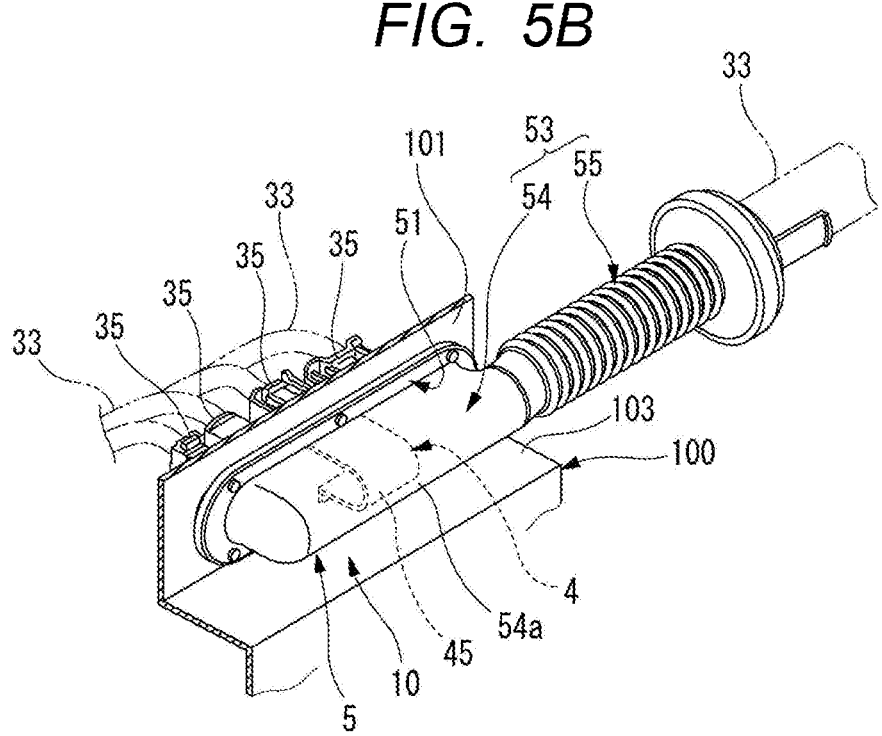
FIG. 5B is a perspective view of the grommet assembly after being mounted to the panel.

Hereinafter, exemplary embodiments of the present invention will be described in detail with reference to the drawings. FIG. 1 is an exploded perspective view of a grommet assembly 10 according to a first embodiment of the present invention. FIG. 2 is a perspective view showing an inner member 1 shown in FIG. 1 during assembly. FIG. 3 is an exploded perspective view of the inner member 1 and a protruding member 4 shown in FIG. 2. FIG. 4 is a sectional view of main parts in a state where the inner member 1 and the protruding member 4 shown in FIG. 3 are assembled. FIG. 5A is a perspective view before mounting. FIG. 5B is a perspective view after the mounting.

The grommet assembly 10 according to the first embodiment includes the inner member 1, a protruding member 4, and a grommet 5, as shown in FIGS. 1, 5A and 5B. The grommet assembly 10 is fitted in and assembled in a mounting hole 105 formed in the panel 100 on a back door side. The grommet assembly 10 is, for example, assembled with a wire harness (electric wires) 33 routed between a vehicle body and a back door in a vehicle such as an automobile to protect and waterproof the wire harness 33.

As shown in FIG. 1, the grommet 5 is integrally molded by an elastic material such as rubber or elastomer, and includes an annular panel contact portion 51 configured to bring a seal part 57 into contact with a surface of a portion 107 of the panel 100 surrounding the mounting hole 105, and a tubular wire housing portion 53 connected to the panel contact portion 51 and configured to cover the wire harness 33 such that the wire harness 33 is bent with respect to the center axis X of the mounting hole 105.

The panel contact portion 51 is formed in an elongated shape. The panel contact portion 51 has a seal part 57 to be pressed and brought into contact with the surface of the portion 107 of the panel 100 surrounding the mounting hole 105, a base part 58 which is a base portion of the seal part 57, and an oval opening part 56 communicating with an internal space of the tubular wire housing portion 53.

Figure 15:
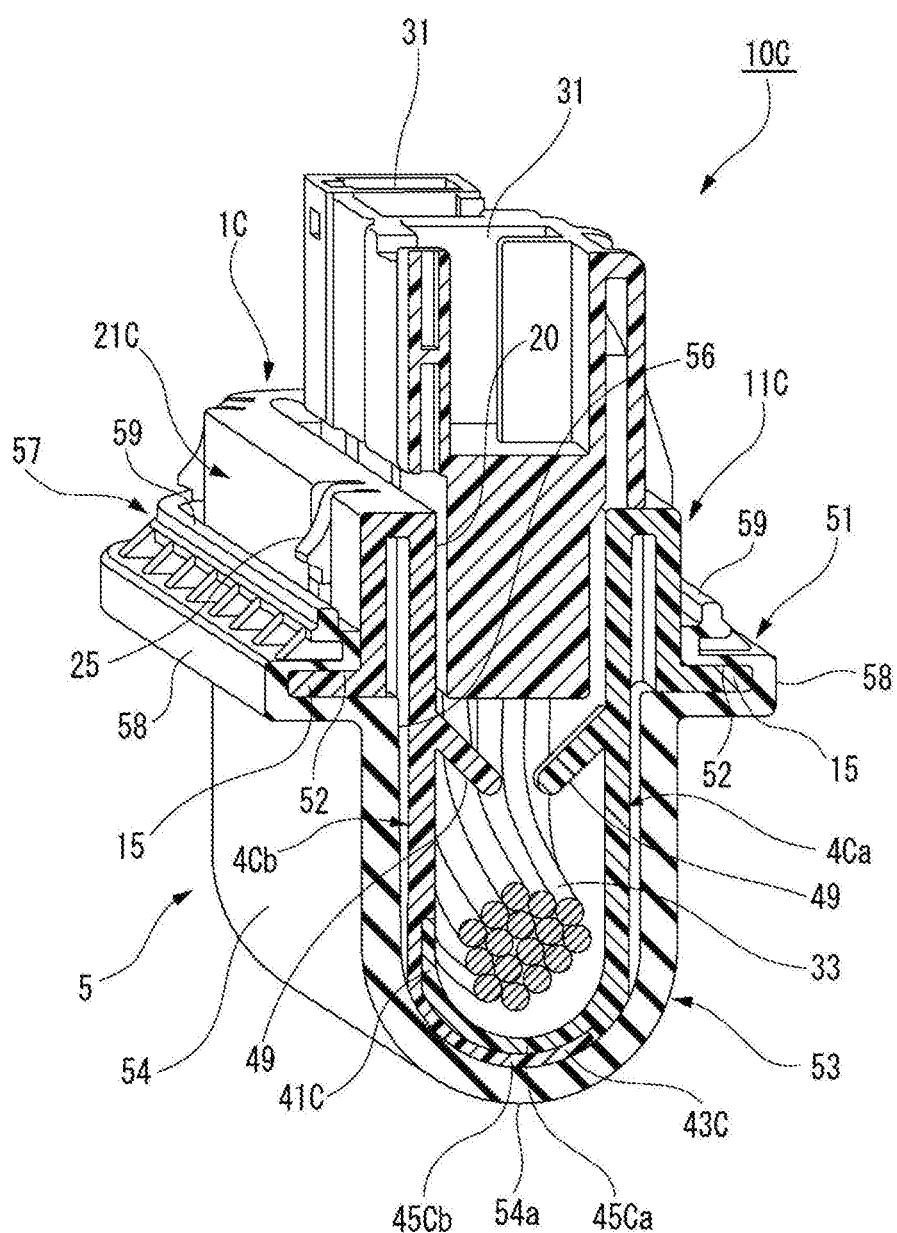
FIG. 15 is a sectional view taken along a line XV-XV in FIG. 14.

The seal part 57 has a lip portion 59 formed so as to be easily bent when a pressing force is applied (see FIG. 15). The lip portion 59 is formed so as to be watertight against the surface of the portion 107 of the panel 100 surrounding the mounting hole 105.

The base part 58 is formed around the oval opening part 56. Therefore, the base part 58 is formed in a substantially frame-shaped portion in the panel contact portion 51. The lip portion 59 is integrally formed on an opposite surface of the base part 58 facing the surface of the portion 107 of the panel 100 surrounding the mounting hole 105. A flange fitting groove 52 is formed on an inner peripheral surface (inner side of the panel contact portion 51) of the base part 58.

The flange fitting groove 52 is formed as a fitting portion for a flange portion 15 of the inner member 1 described later. The flange fitting groove 52 is formed in a groove shape such that the entire periphery of the flange portion 15 can be inserted in. That is, the inner peripheral surface of the base part 58 is recessed toward an outer peripheral surface, and the recess is formed in a groove shape continuous in the entire periphery. The flange fitting groove 52 is formed as a space in contact with a front surface and a rear surface of the flange portion 15. Therefore, the base part 58 having such a flange fitting groove 52 is formed in a U-shaped cross section.

The wire housing portion 53 includes a direction changing tubular portion 54 which bends the wire harness 33 to change a drawing direction, and a bellows-shaped tubular portion 55 as a portion which can be bent freely. The direction changing tubular portion 54 is integrally formed at a rear side of the panel contact portion 51. A ceiling (rear wall) 54a is formed in the direction changing tubular portion 54 such that the wire harness 33 can be changed to an orthogonal direction after being drawn out from the connector 31 fixed to the inner member 1.

As shown in FIGS. 1 to 4, the inner member 1 is made of a hard synthetic resin with insulating property. Here, the hard synthetic resin is a material that hardly elastically deforms or has a much smaller amount of elastic deformation as compared with the elastic material configuring the grommet 5. As shown in FIG. 2, the inner member 1 is configured by a first half portion 11 and a second half portion 21 divided into two in a longitudinal direction along an insertion direction (center axis X direction of the mounting hole 105) into a flat tubular body having an oval opening.

As shown in FIGS. 2 and 3, the first half portion 11 and the second half portion 21 are configured such that a linear portion of a body portion 13 formed in a semi-oval shape and a linear portion of a body portion 23 formed in a semi-elliptical shape face each other, and one end portion of the first half portion 11 and one end portion of the second half portion 21 are connected with each other by a thin hinge 14. The one end of the first half portion 11 and the one end portion of the second half portion 21 are rotatably connected to each other by the elastically deformable thin hinge 14, so that the other end portion of the first half portion 11 and the other end portion of the second half portion 21 come close to and separate from each other.

A locking protrusion 18 formed in an arm shape protruding toward the other end of the first half portion 11 is formed on the other end of the second half portion 21. A locking recess 19 which is a recessed groove in which the locking protrusion 18 of the second half portion 21 can enter and being locked is formed on the other end of the first half portion 11.

When the locking protrusion 18 and the locking recess 19 are locked, the first half portion 11 and the second half portion 21 are formed in an oval tubular shape in which the body portions 13, 23 are combined as opposed walls, and the shape matches an opening shape of the mounting hole 105 of the panel 100. Panel engagement portions 25 to be engage with an opening edge 106 of the mounting hole 105 are formed on the outer periphery of the body portions 13, 23 at a front end side. The panel engagement portion 25 is formed in a cantilever arm shape and has elasticity. The panel engagement portion 25 is formed with an outward protrusion at a front end. In the first embodiment, the body portions 13, 23 are each formed with two panel engagement portions 25.

As shown in FIGS. 3 and 4, flange portions 15 protruding outward are respectively formed on the outer periphery of the body portions 13, 23 at the rear side. The flange portion 15 is configured to face the surface of the portion 107 of the panel 100 surrounding the mounting hole 105 so as to be parallel to the surface of the portion 107 of the panel 100 surrounding the mounting hole 105. Further, lock portions 27 to which locking pieces 44 of the protruding member 4 described later are locked are formed on the outer periphery of the body portions 13, 23 in substantially central positions in the longitudinal direction. In the first embodiment, the body portions 13, 23 each are provided with a pair of lock portions 27.

As shown in FIG. 2, a plurality of fix portions 17 for fixing the connectors 31 connected to electric wire ends of the wire harnesses 33 are formed in the body portion 13 of the first half portion 11. The fix portion 17 is a locking protrusion protruding in a connector fitting direction, and is configured to lock a lock portion of the connector 31 so as to fix the connector 31 to the inner member 1. As shown in FIGS. 5A and 5B, the connectors 31 are to be fitted in mating connectors 35 provided in the panel 100 on a back door side, and are electrically connected to the wire harnesses 33 on the back door side.

As shown in FIGS. 3 and 4, the protruding member 4 is made of a hard synthetic resin with insulating property. The protruding member 4 is provided to protrude from the rear side of the body portions 13, 23 which are combined as opposed walls. The protruding member 4 is formed in a substantially U-shape configured by facing wall portions 41, 43 parallel to each other, and an arc-shaped wall 45 connecting one ends of the facing wall portions 41, 43.

A pair of locking pieces 44 and one panel engagement portion 46 are formed at the other ends of the facing wall portions 41, 43, respectively. The locking pieces 44 are respectively locked to the lock portions 27 of the body portions 13, 23, so that the protruding member 4 is fixed to the inner member 1. Therefore, the protruding member 4 is formed in an arch shape protruding from the rear side so as to bridge an oval opening 20 defined by the opposed walls of the body portions 13, 23 in a lateral direction perpendicular to the longitudinal direction of the oval opening 20. As shown in FIGS. 5A and 5B, when the grommet 5 is mounted to the rear side of the inner member 1, the arc-shaped wall 45 of the protruding member 4 configures a pressing support portion that extends along an inner surface of the ceiling 54a in the direction changing tubular portion 54 of the wire housing portion 53.

Next, an assembling operation of the grommet assembly 10 for mounting the grommet 5 on the inner member 1 will be described. First, as shown in FIG. 2, in a state where the other end portions of the first half portion 11 and second half portion 21 are separated from each other, the connectors 31 connected to the ends of the wire harnesses 33 passing through the grommet 5 are fixed to the fix portions 17 of the body portion 13.

As shown in FIG. 3, when the one end portions of the first half portion 11 and second half portion 21 are close to each other and the locking protrusion 18 is locked to the locking recess 19, the wire harnesses 33 are inserted into the oval opening 20 of the inner member 1. That is, the inner member 1 is configured by the first half portion 11 and the second half portion 21 divided in two, so that it is not necessary to pass the wire harnesses 33 through the oval opening 20 first, and the assemblability is improved.

Next, the locking pieces 44 of the protruding member 4 are locked to the lock portions 27 of the body portions 13, 23 while the wire harnesses 33 are housed between the facing wall portions 41, 43 of the protruding member 4, so that the protruding member 4 is fixed to the rear side of the inner member 1 (see FIGS. 1 and 4).

As shown in FIG. 1, the panel contact portion 51 of the grommet 5 is brought close to the rear side of the inner member 1 to which the protruding member 4 is integrally fixed. Next, the flange portions 15 of the inner member 1 are inserted into the flange fitting groove 52 of the panel contact portion 51, and the flange portions 15 are covered by the flange fitting groove 52 over the entire periphery. Therefore, the mounting of the grommet 5 to the inner member 1 is completed, and the assembling of the grommet assembly 10 is completed.

Next, the mounting operation when mounting the grommet assembly 10 according to the first embodiment to the panel 100 will be described. As shown in FIG. 5A, the long oval mounting hole 105 is formed in the panel 100. Here, in a mounting panel 101 in which the mounting hole 105 is formed, a vertical panel 103 is provided in the vicinity of the mounting hole 105.

First, the body portions 13, 23 of the inner member 1 in the grommet assembly 10 are inserted into the mounting hole 105 to engage the panel engagement portion 25 and the panel engagement portion 46 with the opening edge 106 of the mounting hole 105, and the seal part 57 of the panel contact portion 51 is pressed against and brought into tight contact with the surface of the portion 107 of the panel 100 surrounding the mounting hole 105.

At this time, since the vertical panel 103 is provided in the vicinity of the mounting hole 105, there is not a sufficient space for the operator's hand to get in on a vertical panel 103 side of the grommet assembly 10, and it is not possible to press the panel contact portion 51 on the vertical panel 103 side with a finger. However, according to the grommet assembly 10 of the first embodiment, the arc-shaped wall (pressing support portion) 45 of the protruding member 4 provided to protrude from the rear side of the body portions 13, 23 of the inner member 1 is disposed along the inner surface of the ceiling 54a of the wire housing portion 53 of the grommet 5.

Therefore, when mounting the grommet assembly 10 to the panel 100, the ceiling 54a of the wire housing portion 53 is pressed from above with a finger, so that the inner surface of the ceiling 54a of the elastically deformed wire housing portion 53 comes into contact with the arc-shaped wall 45 of the protruding member 4, and the pressing force is transmitted to the protruding member 4. That is, the pressing force applied by the operator on the grommet assembly 10 is reliably transmitted to the panel engagement portions 25 of the body portions 13, 23 and to the panel engagement portions 46 of the protruding member 4 through the protruding member 4.

Therefore, the panel engagement portions 25, 46 can be reliably engaged with the opening edge 106 of the mounting hole 105 by pressing the ceiling 54a of the wire housing portion 53 with a finger, and the mounting work to the panel 100 can be easily performed regardless of the panel shape of the mounting position.

Figure 6:
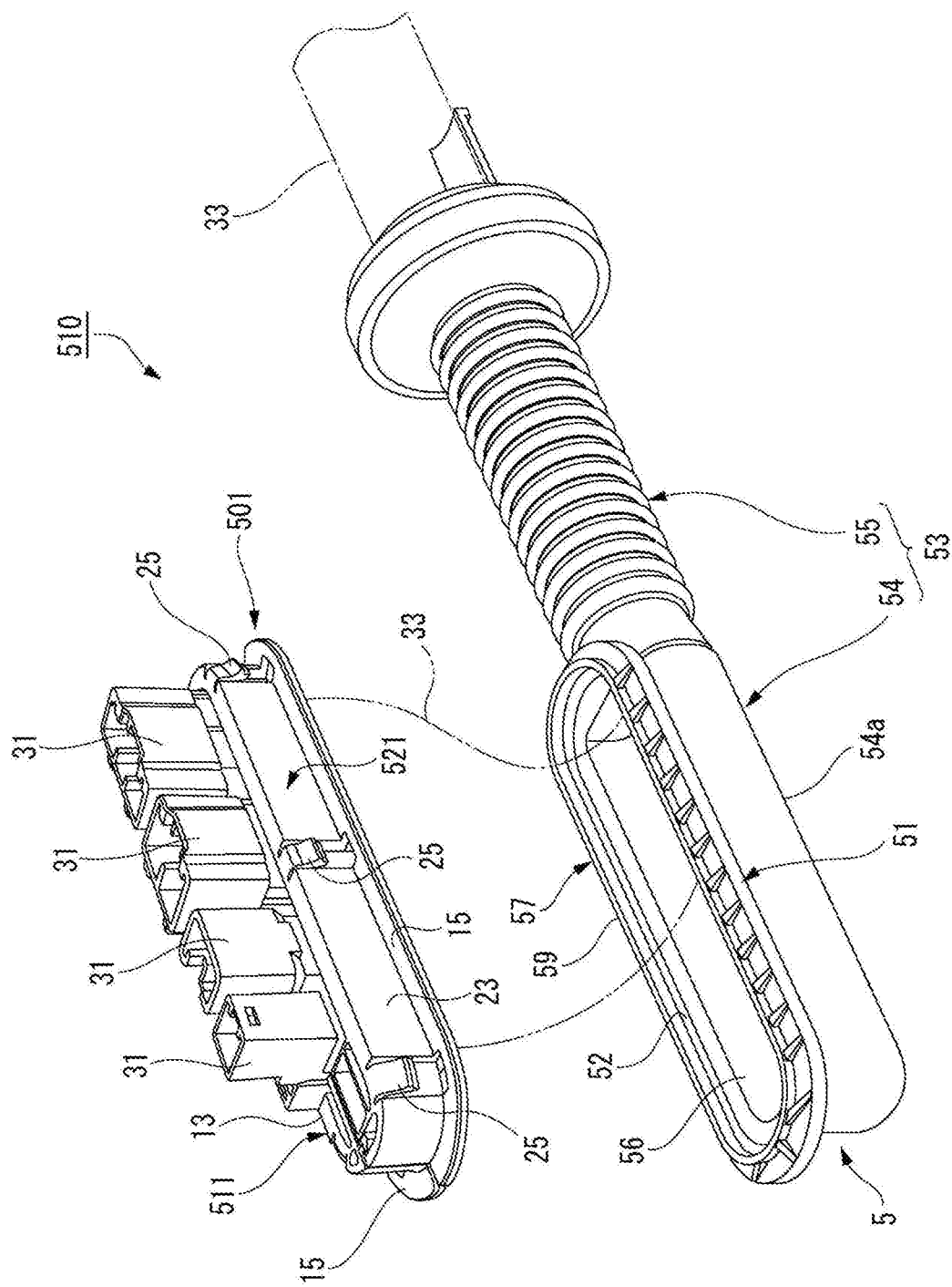
FIG. 6 is an exploded perspective view of a grommet assembly according to a reference example.
Figure 7:
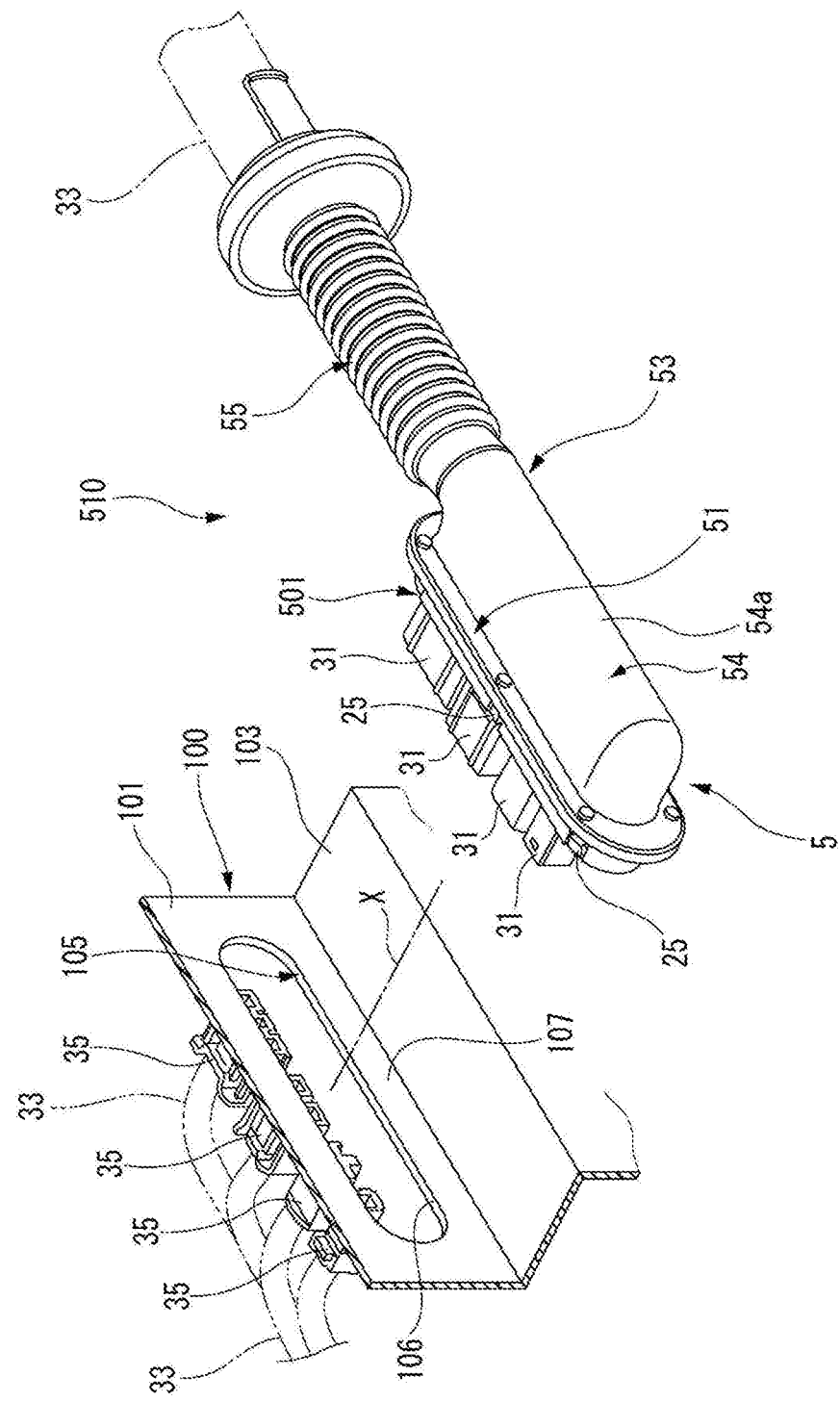
FIG. 7 is a perspective view before the grommet assembly shown in FIG. 6 is mounted to the panel.

FIG. 6 is an exploded perspective view of a grommet assembly 510 according to a reference example. FIG. 7 is a perspective view before the grommet assembly 510 shown in FIG. 6 is mounted to the panel 100. In the grommet assembly 510 according to the reference example, the same configurations as those of the grommet assembly 10 according to the first embodiment are denoted by the same reference numerals, and the descriptions thereof are omitted.

The grommet assembly 510 according to the reference example includes an inner member 501 and the grommet 5 as shown in FIG. 6. The inner member 501 is configured by a first half portion 511 and a second half portion 521 divided into two in a longitudinal direction along an insertion direction (center axis X direction of the mounting hole 105) into a flat tubular body having an oval opening.

In the reference example, the body portions 13, 23 are each formed with three panel engagement portions 25. The assembling operation of the grommet assembly 510 for mounting the grommet 5 to the inner member 501 is the same as the assembling operation of the grommet assembly 10 of the first embodiment.

Next, the mounting operation when mounting the grommet assembly 510 according to the reference example to the panel 100 will be described. First, the body portions 13, 23 of the inner member 501 in the grommet assembly 510 are inserted into the mounting hole 105 to engage the panel engagement portion 25 with the opening edge 106 of the mounting hole 105, and the seal part 57 of the panel contact portion 51 is pressed against and brought into tight contact with the surface of the portion 107 of the panel 100 surrounding the mounting hole 105.

At this time, it is necessary to engage the panel engagement portions 25 with the opening edge 106 of the mounting hole 105 by pressing the panel contact portion 51 on both sides of the direction changing tubular portion 54 of the grommet 5 with a finger. However, since the vertical panel 103 is provided in the vicinity of the mounting hole 105, there is no sufficient space for the operator's hand to get in on a vertical panel 103 side of the grommet assembly 510, and it is not possible to press the panel contact portion 51 on the vertical panel 103 side with a finger.

Further, since the grommet 5 is made of an elastic material, the grommet 5 will be elastically deformed even if the ceiling 54a of the wire housing portion 53 is pressed. Therefore, even if the ceiling 54a of the wire housing portion 53 is pressed, the pressing force is not sufficiently transmitted to the panel contact portion 51, and the panel engagement portions 25 cannot be reliably locked to the opening edge 106 of the mounting hole 105.

On the other hand, in the grommet assembly 10 of the first embodiment, the panel engagement portions 25, 46 can be reliably engaged with the opening edge 106 of the mounting hole 105 through the protruding member 4 provided on the inner member 1 by pressing the ceiling 54a of the wire housing portion 53 with a finger as described above. Therefore, the grommet assembly 10 of the first embodiment can be easily mounted to the panel 100 regardless of the panel shape of a mounting position.

According to the grommet assembly 10 of the first embodiment, the flange portions 15 of the body portions 13, 23 of the inner member 1 are inserted into the flange fitting groove 52 of the panel contact portion 51 of the grommet 5. Therefore, when mounting the grommet assembly 10 to the panel 100, a pressing force is transmitted to the flange portions 15 of the body portions 13, 23 by pressing the panel contact portion 51 of the grommet 5 with a finger. That is, the pressing force applied by the operator on the grommet assembly 10 is reliably transmitted to the panel engagement portions 25 of the body portions 13, 23 through the flange portions 15. Therefore, the panel engagement portions 25 can be reliably engaged with the opening edge 106 of the mounting hole 105 by pressing at least one of the panel contact portion 51 and the wire housing portion 53 of the grommet 5 with a finger, and the operation for mounting the grommet assembly to the panel 100 can be further improved.

Further, according to the grommet assembly 10 of the first embodiment, the body portions 13, 23 fitted into the mounting hole 105 having the oval opening are formed in an oval tubular shape having the oval opening 20. The protruding member 4 is formed in an arch shape protruding from the rear side of the body portions 13, 23 which are combined as opposed walls so as to bridge the oval opening 20 in the lateral direction of the oval opening 20, and is disposed at substantially central positions on the body portions 13, 23 with respect to the longitudinal direction of the oval opening 20.

Therefore, when mounting the grommet assembly 10 to the panel 100, the pressing force transmitted to the protruding member 4 in the substantially central position can be easily and uniformly transmitted to the entire body portion of the body portions 13, 23 in the elongated inner member 1, and the plurality of panel engagement portions 25 formed in the body portions 13, 23 and the panel engagement portions 46 of the protruding member 4 can be reliably engaged with the opening edge 106 of the mounting hole 105.

Further, the protruding member 4 formed in the arch shape so as to be bridged between the body portions 13, 23 which are combined as opposed walls at the substantially central positions on the body portions 13, 25 with respect to the longitudinal direction of the oval opening 20 can increase the rigidity of the body portions 13, 23 at the substantially central positions having relatively low rigidity due to being formed into the oval tubular shape having the oval opening 20, and can prevent the deformation of the body portions 13, 23. Therefore, it is possible to prevent the case where the body portions 13, 23 inserted into the mounting hole 105 of the panel 100 are deformed inward, and the panel engagement portions 25 are not able to engage with the opening edge 106 of the mounting hole 105.

Figure 8:
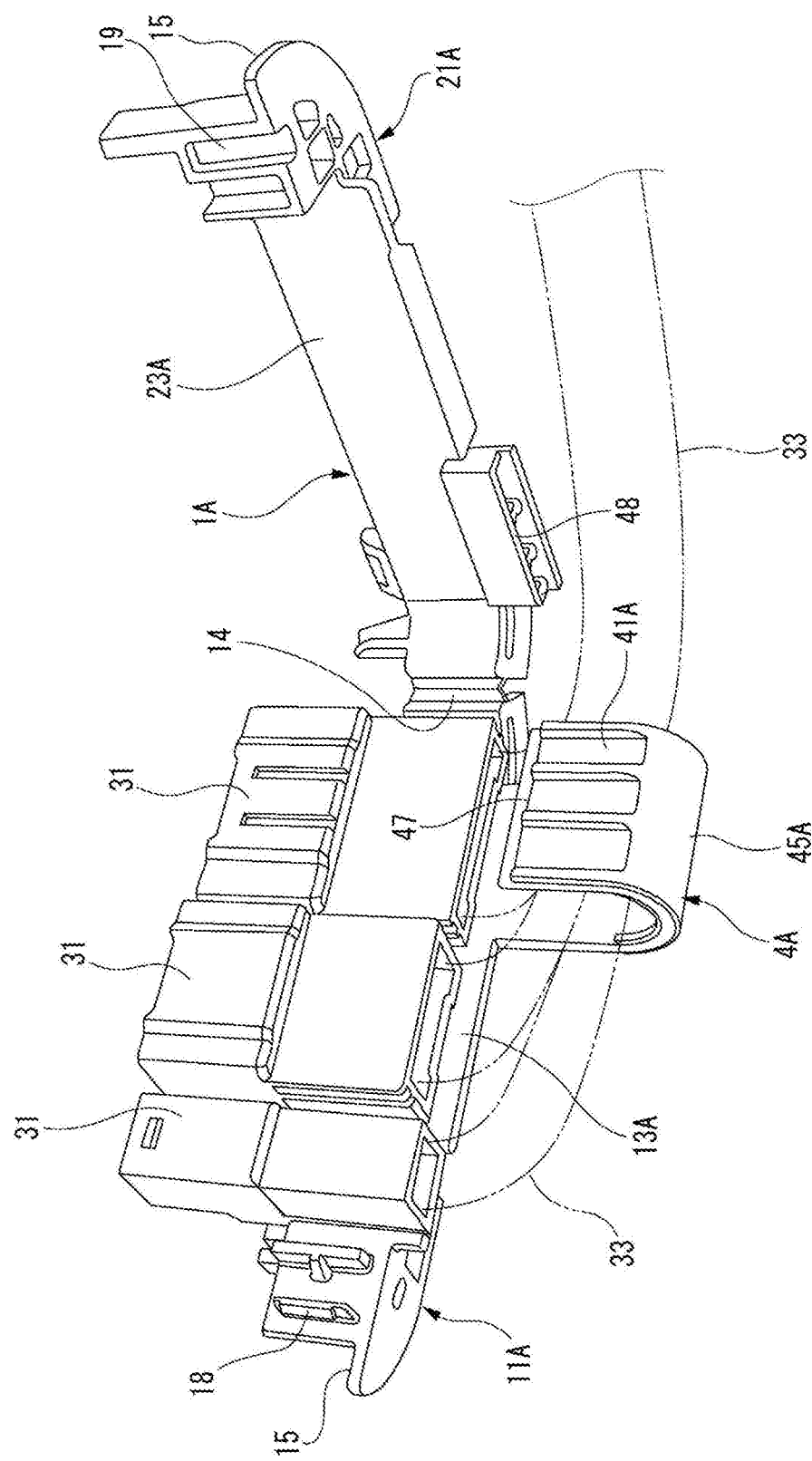
FIG. 8 is a perspective view showing an inner member of a grommet assembly according to a second embodiment of the present invention during assembly.
Figure 9:
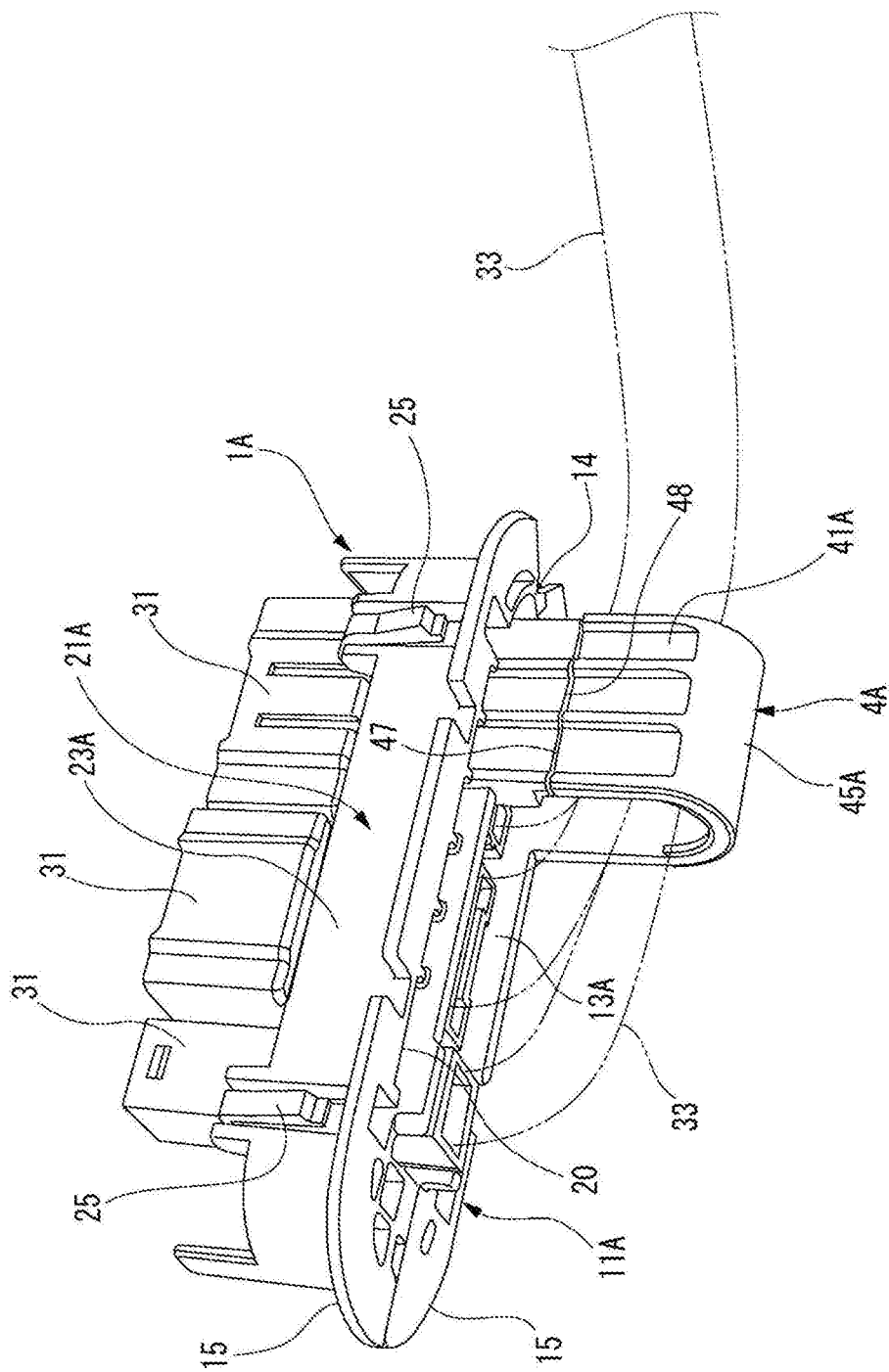
FIG. 9 is a perspective view showing a state in which the inner member shown in FIG. 8 is assembled.

FIG. 8 is a perspective view showing an inner member 1A of a grommet assembly according to a second embodiment of the present invention during assembly. FIG. 9 is a perspective view showing a state in which the inner member 1A shown in FIG. 8 is assembled. In the inner member 1A according to the second embodiment, the same configurations as those of the inner member 1 according to the first embodiment are denoted by the same reference numerals, and the descriptions thereof are omitted.

As shown in FIG. 8, the inner member 1A according to the second embodiment of the present invention is configured by a first half portion 11A and a second half portion 21A divided into two in a longitudinal direction along a fitting direction (center axis X direction of the mounting hole 105) into a flat tubular body having an oval opening. A first protruding part (protruding member) 4A having a first pressing support portion (pressing support portion) 45A extending along the inner surface of the ceiling 54a of the wire housing portion 53 is provided on a rear side of a body portion 13A in the first half portion 11A.

The first protruding part 4A is integrally formed with the body portion 13A and is formed in a substantially U shape, which protrudes toward the ceiling 54a of the wire housing portion 53 of the mounted grommet 5, and has a first folded portion 41A folded back in a direction opposite to the protruding direction (downward in FIG. 8) of a front end of the first pressing support portion 45A extending along the inner surface of the ceiling 54a. An engagement step portion 47 to be engaged with a support step portion 48 provided on the rear side of the body portion 23A of the second half portion 21A is formed at a front end portion of the first folded portion 41A.

As shown in FIG. 8, in a state where the other end portions of the first half portion 11A and second half portion 21A are separated from each other, the connectors 31 connected to the ends of the wire harnesses 33 passing through the grommet 5 are fixed to the fix portions 17 of the body portion 13A. At this time, the workability is favorable since the wire harnesses 33 drawn out from the connectors 31 are routed and organized in the first folded portion 41A of the first protruding part 4A.

Next, as shown in FIG. 9, when the one end portions of the first half portion 11A and second half portion 21A are close to each other and the locking protrusion 18 is locked to the locking recess 19, the wire harnesses 33 are inserted into the oval opening 20 of the inner member 1A. When the locking protrusion 18 and the locking recess 19 are locked, in the first half portion 11A and the second half portion 21A, the body portion 13A and the body portion 23A are combined as opposed walls, so that the engagement step portion 47 of the first folded portion 41A is engaged with the support step portion 48. By engaging with the engagement step portion 47, the support step portion 48 can transmit a pressing force transmitted to the first folded portion 41A to the body portion 23A when the pressing force is applied on the first pressing support portion 45A of the first protruding part 4A.

Similar to the inner member 1 according to the first embodiment, in the inner member 1A according to the second embodiment, the flange portions 15 of the inner member 1A are inserted into the flange fitting groove 52 of the panel contact portion 51, and the flange portions 15 are covered by the flange fitting groove 52 over the entire periphery, so that the mounting of the grommet 5 to the inner member 1A is completed.

Therefore, according to the grommet assembly of the second embodiment in which the grommet 5 is mounted on the inner member 1A, the first pressing support portion (pressing support portion) 45A of the first protruding part (protruding member) 4A provided to protrude from the rear side of the body portions 13A, 23A of the inner member 1A is disposed along the inner surface of the ceiling 54a of the wire housing portion 53 of the grommet 5.

Therefore, when mounting the grommet assembly to the panel, the ceiling 54a of the wire housing portion 53 is pressed from above with a finger, so that the inner surface of the ceiling 54a of the elastically deformed wire housing portion 53 comes into contact with the first pressing support portion 45A of the first protruding part 4A, and the pressing force is transmitted to the first protruding part 4A. That is, the pressing force applied by the operator on the grommet assembly is reliably transmitted to the panel engagement portions 25 of the body portions 13A, 23A through the first protruding part 4A.

Therefore, the panel engagement portions 25 can be reliably engaged with the opening edge 106 of the mounting hole 105 by pressing the ceiling 54a of the wire housing portion 53 with a finger. Therefore, similar to the grommet assembly 10 of the first embodiment, the grommet assembly according to the second embodiment can be easily mounted to the panel 100 regardless of the panel shape of a mounting position.

Figure 10:
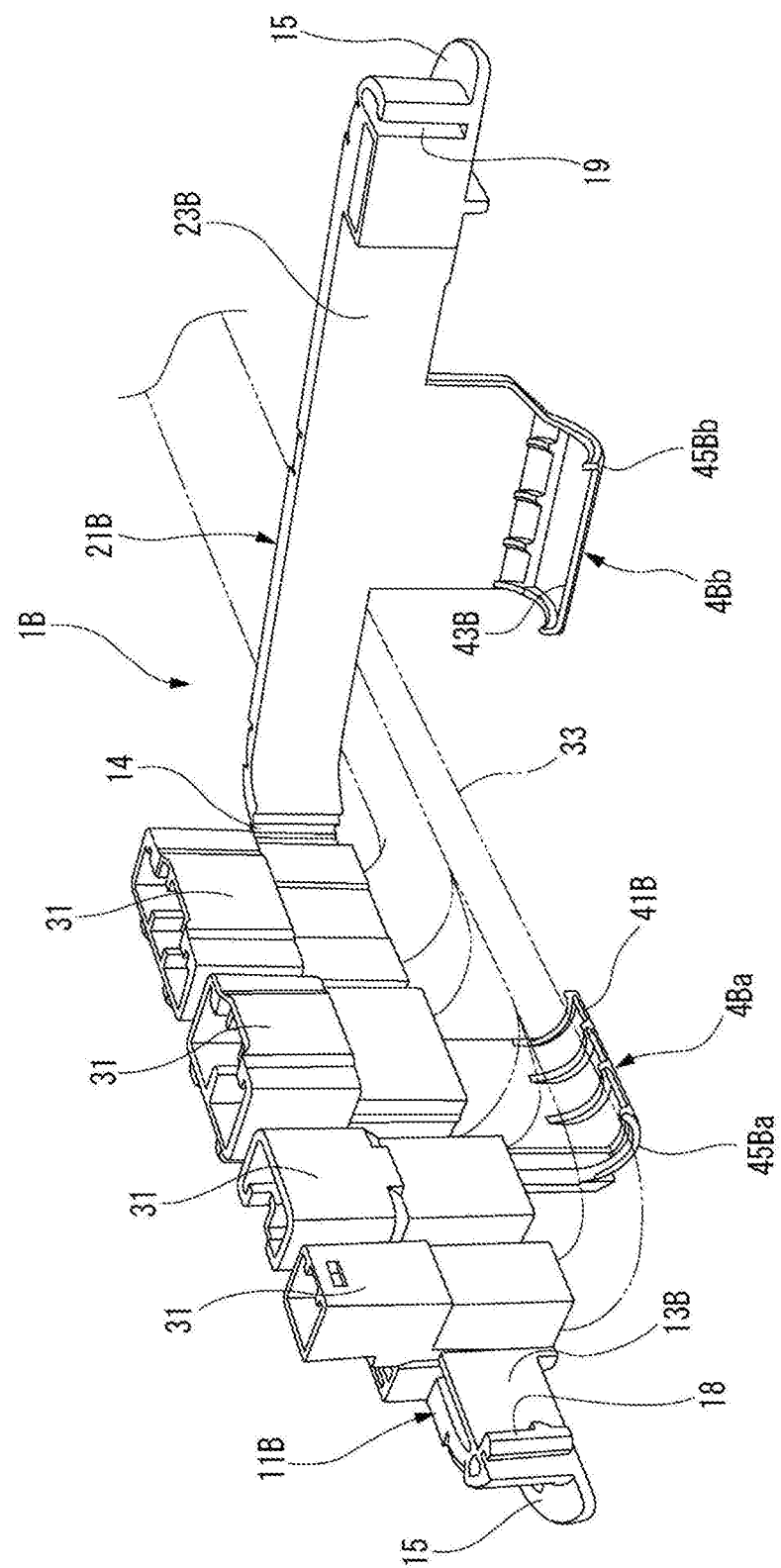
FIG. 10 is a perspective view showing an inner member of a grommet assembly according to a third embodiment of the present invention during assembly.
Figure 11:
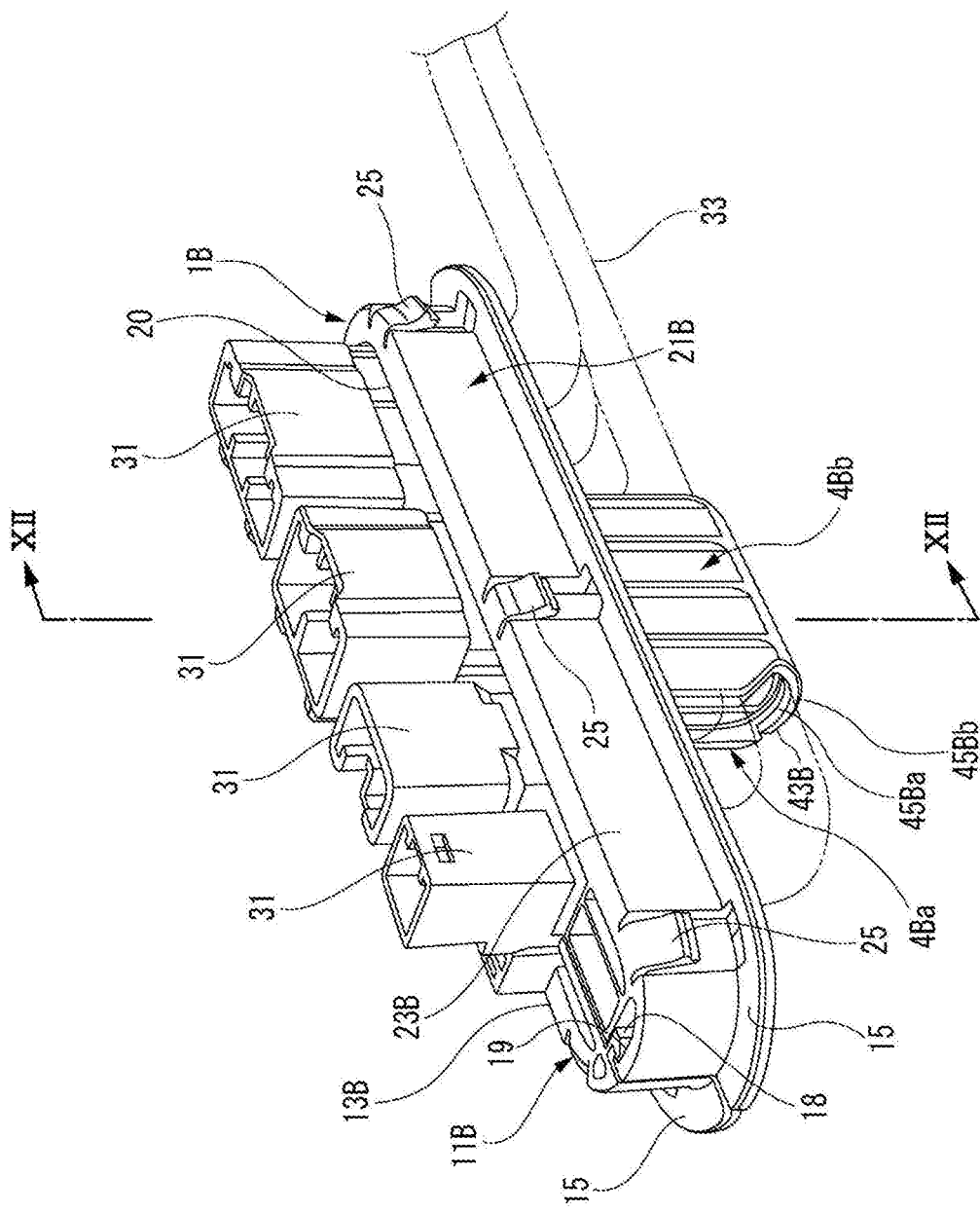
FIG. 11 is a perspective view showing a state in which the inner member shown in FIG. 10 is assembled.

FIG. 10 is a perspective view showing an inner member 1B of a grommet assembly according to a third embodiment of the present invention during assembly. FIG. 11 is a perspective view showing a state in which the inner member 1B shown in FIG. 10 is assembled. In the inner member 1B according to the third embodiment, the same configurations as those of the inner member 1 according to the first embodiment are denoted by the same reference numerals, and the descriptions thereof are omitted.

As shown in FIG. 10, the inner member 1B according to the third embodiment of the present invention is configured by a first half portion 11B and a second half portion 21B divided into two in a longitudinal direction along a fitting direction (center axis X direction of the mounting hole 105) into a flat tubular body having an oval opening.

A first protruding part (protruding member) 4Ba having a first pressing support portion (pressing support portion) 45Ba extending along the inner surface of the ceiling 54a of the wire housing portion 53 is provided on a rear side of a body portion 13B in the first half portion 11B. The first protruding part 4Ba is integrally formed with the body portion 13B and is formed in a substantially J shape, which protrudes toward the ceiling 54a of the wire housing portion 53 of the mounted grommet 5, and has a first folded portion 41B folded back in a direction opposite to the protruding direction (downward in FIG. 10) of a front end of the first pressing support portion 45Ba extending along the inner surface of the ceiling 54a.

A second protruding part (protruding member) 4Bb having a second pressing support portion (pressing support portion) 45Bb extending along the inner surface of the ceiling 54a of the wire housing portion 53 is provided on a rear side of a body portion 23B in the second half portion 21B. The second protruding part 4Bb is integrally formed with the body portion 23B and is formed in a substantially J shape, which protrudes toward the ceiling 54a of the wire housing portion 53 of the mounted grommet 5, and has a second folded portion 43B covering the first pressing support portion 45Ba and folded back in a direction opposite to the protruding direction (downward in FIG. 10) of a front end of the second pressing support portion 45Bb extending along the inner surface of the ceiling 54a.

As shown in FIG. 10, in a state where the other end portions of the first half portion 11B and second half portion 21B are separated from each other, the connectors 31 connected to the ends of the wire harnesses 33 passing through the grommet 5 are fixed to the fix portions 17 of the body portion 13B. At this time, the workability is favorable since the wire harnesses 33 drawn out from the connectors 31 are routed and organized in the first folded portion 41B of the first protruding part 4Ba.

Figure 12:
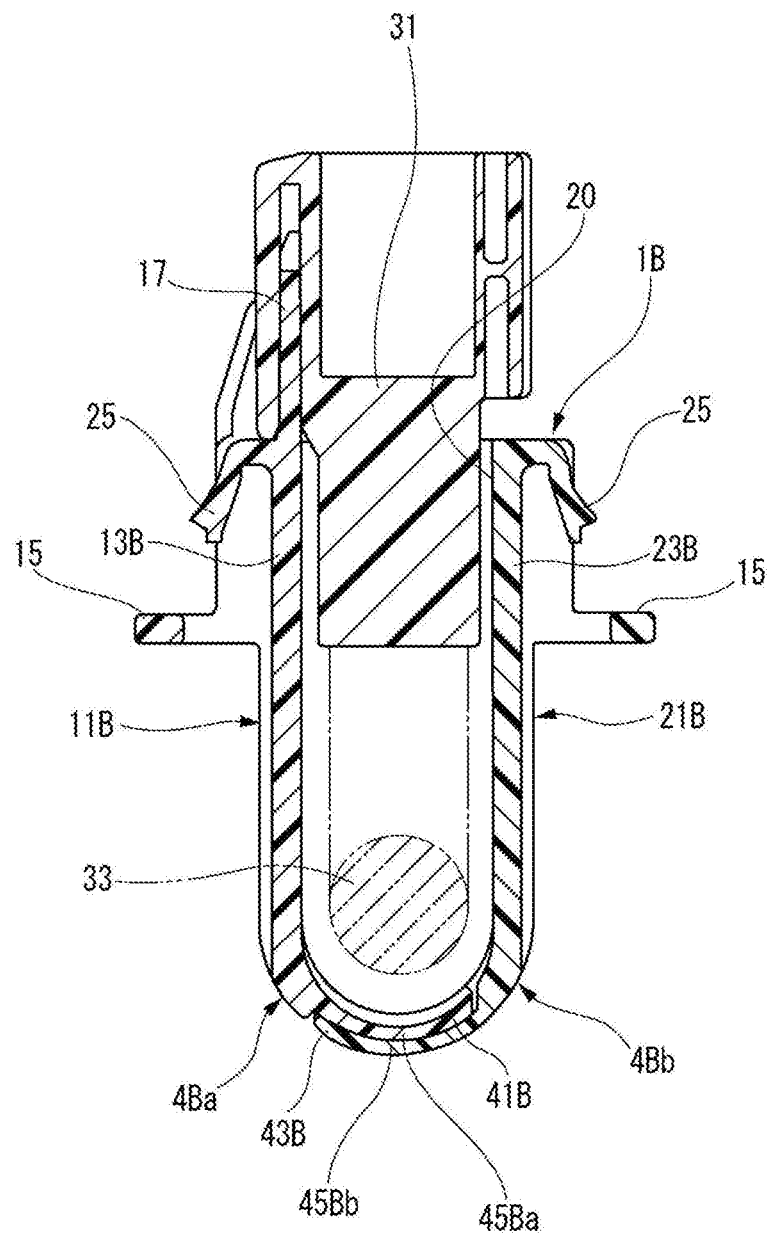
FIG. 12 is a sectional view taken along a line XII-XII in FIG. 11.

Next, as shown in FIG. 11, when the one end portions of the first half portion 11B and second half portion 21B are close to each other and the locking protrusion 18 is locked to the locking recess 19, the wire harnesses 33 are inserted into an oval opening 20 of the inner member 1B. When the locking protrusion 18 and the locking recess 19 are locked, in the first half portion 11B and the second half portion 21B, the body portion 13B and the body portion 23B are combined as opposed walls, so that the first pressing support portion 45Ba of the first protruding part 4Ba and the second pressing support portion 45Bb of the second protruding part 4Bb overlap. As shown in FIG. 12, by overlapping the first pressing support portion 45Ba and the second pressing support portion 45Bb, a pressing force applied to the second pressing support portion 45Bb can be transmitted to the first pressing support portion 45Ba when the pressing force is applied on the second pressing support portion 45Bb of the second protruding part 4Bb. Then, the pressing force transmitted to the first pressing support portion 45Ba can be transmitted to the body portion 13B through the first protruding part 4Ba.

Similar to the inner member 1 according to the first embodiment, in the inner member 1B according to the third embodiment, the flange portions 15 of the inner member 1B are inserted into the flange fitting groove 52 of the panel contact portion 51, and the flange portions 15 are covered by the flange fitting groove 52 over the entire periphery, so that the mounting of the grommet 5 to the inner member 1B is completed.

Therefore, according to the grommet assembly of the third embodiment in which the grommet 5 is mounted on the inner member 1B, the first pressing support portion (pressing support portion) 45Ba of the first protruding part (protruding member) 4Ba provided to protrude on the rear side of the body portion 13B and the body portion 23B in the inner member 1B, and the second pressing support portion (pressing support portion) 45Bb of the second protruding part (protruding member) 4Bb are disposed along the inner surface of the ceiling 54a of the wire housing portion 53 in the grommet 5.

Therefore, when mounting the grommet assembly to the panel, the ceiling 54a of the wire housing portion 53 is pressed from above with a finger, so that the inner surface of the ceiling 54a in the elastically deformed wire housing portion 53 comes into contact with the second pressing support portion 45Bb of the second protruding part 4Bb, and the pressing force is transmitted to the first protruding part 4Ba through the first pressing support portion 45Ba. That is, the pressing force applied by the operator on the grommet assembly is reliably transmitted to the panel engagement portions 25 of the body portion 13B and body portion 23B through the first protruding part 4Ba and the second protruding part 4Bb.

Therefore, the panel engagement portions 25 can be reliably engaged with the opening edge 106 of the mounting hole 105 by pressing the ceiling 54a of the wire housing portion 53 with a finger. Therefore, similar to the grommet assembly 10 of the first embodiment, the grommet assembly according to the third embodiment can be easily mounted to the panel 100 regardless of the panel shape of a mounting position.

Figure 13:
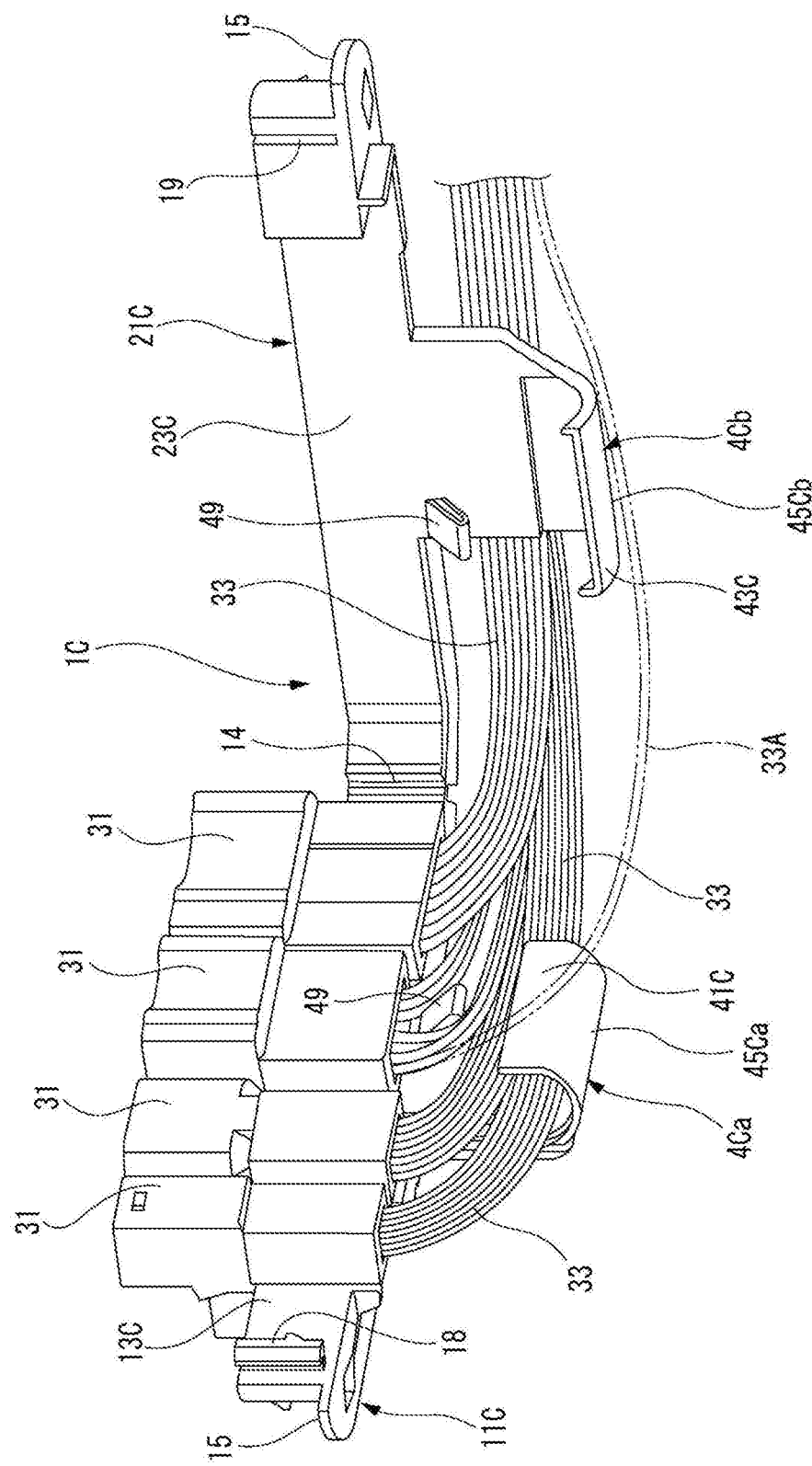
FIG. 13 is a perspective view showing an inner member of a grommet assembly according to a fourth embodiment of the present invention during assembly.
Figure 14:
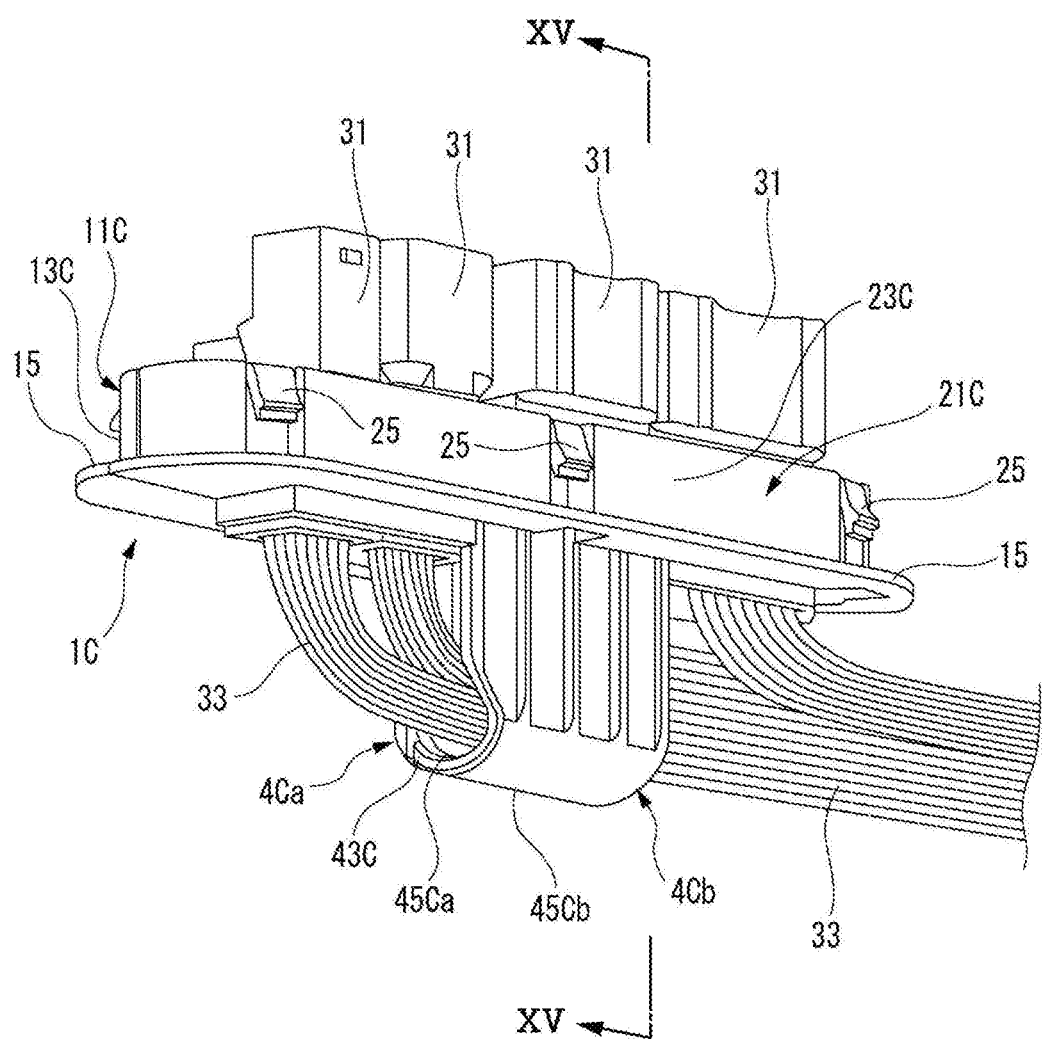
FIG. 14 is a perspective view showing a state in which the inner member shown in FIG. 13 is assembled.

FIG. 13 is a perspective view showing an inner member 1C of a grommet assembly 10C according to a fourth embodiment of the present invention during assembly. FIG. 14 is a perspective view showing a state in which the inner member 1C shown in FIG. 13 is assembled. FIG. 15 is a sectional view taken along a line XV-XV in FIG. 14. In the inner member 1C according to the fourth embodiment, the same configurations as those of the inner member 1 according to the first embodiment are denoted by the same reference numerals, and the descriptions thereof are omitted.

As shown in FIG. 13, the inner member 1C according to the fourth embodiment of the present invention is configured by a first half portion 11C and a second half portion 21C divided into two in a longitudinal direction along a fitting direction (center axis X direction of the mounting hole 105) into a flat tubular body having an oval opening.

A first protruding part (protruding member) 4Ca having a first pressing support portion (pressing support portion) 45Ca extending along the inner surface of the ceiling 54a of the wire housing portion 53 is provided on a rear side of the body portion 13C in the first half portion 11C. The first protruding part 4Ca is integrally formed with a body portion 13C, and is formed in a substantially J shape, which protrudes toward the ceiling 54a of the wire housing portion 53 of the mounted grommet 5, and has a first folded portion 41C folded back in a direction opposite to the protruding direction (downward in FIG. 13) of a front end of the first pressing support portion 45Ca extending along the inner surface of the ceiling 54a.

A second protruding part (protruding member) 4Cb having a second pressing support portion (pressing support portion) 45Cb extending along the inner surface of the ceiling 54a of the wire housing portion 53 is provided on a rear side of a body portion 23C in the second half portion 21C. The second protruding part 4Cb is integrally formed with the body portion 23C, and is formed in a substantially J shape, which protrudes toward the ceiling 54a of the wire housing portion 53 of the mounted grommet 5, and has a second folded portion 43C covering the first pressing support portion 45Ca and folded back in a direction opposite to the protruding direction (downward in FIG. 13) of a front end of the second pressing support portion 45Cb extending along the inner surface of the ceiling 54a. The first folded portion 41C to which the wire harness 33 is routed is formed longer than the second folded portion 43C.

As shown in FIG. 13, in a state where the other end portions of the first half portion 11C and second half portion 21C are separated from each other, the connectors 31 connected to the ends of the wire harnesses 33 passing through the grommet 5 are fixed to the fix portions 17 of the body portion 13C. At this time, the workability is favorable since the wire harnesses 33 drawn out from the connectors 31 are routed and organized in the first folded portion 41C of the first protruding part 4Ca.

Further, at least on an inner wall surface of the first protruding part 4Ca, an electric wire regulating portion 49 is provided to protrude and configured to prevent a part of electric wires 33A of the wire harnesses 33 routed in the first folded portion 41C from coming out of the first folded portion 41C as shown by an imaginary line in FIG. 13. The electric wire regulating portion 49 is a protruding piece that obliquely protrudes from the inner wall surface of the first protruding part 4Ca to the rear side of the inner member 1C. In the inner member 1C according to the fourth embodiment, the electric wire regulating portion 49 is also provided to protrude on an inner wall surface of the second protruding part 4Cb.

Next, as shown in FIG. 14, when the one end portions of the first half portion 11C and second half portion 21C are close to each other and the locking protrusion 18 is locked to the locking recess 19, the wire harnesses 33 are inserted into an oval opening 20 of the inner member 1C. When the locking protrusion 18 and the locking recess 19 are locked, in the first half portion 11C and the second half portion 21C, the body portion 13C and the body portion 23C are combined as opposed walls, so that the first pressing support portion 45Ca of the first protruding part 4Ca and the second pressing support portion 45Cb of the second protruding part 4Cb overlap. As shown in FIG. 15, by overlapping the first pressing support portion 45Ca and the second pressing support portion 45Cb, a pressing force applied to the second pressing support portion 45Cb can be transmitted to the first pressing support portion 45Ca when the pressing force is applied on the second pressing support portion 45Cb of the second protruding part 4Cb. Then, the pressing force transmitted to the first pressing support portion 45Ca can be transmitted to the body portion 13C through the first protruding part 4Ca.

Similar to the inner member 1 according to the first embodiment, in the inner member 1C according to the fourth embodiment, the flange portions 15 of the inner member 1C are inserted into the flange fitting groove 52 of the panel contact portion 51, and the flange portions 15 are covered by the flange fitting groove 52 over the entire periphery. Therefore, the mounting of the grommet 5 to the inner member 1C is completed, and the assembling of the grommet assembly 10C is completed.

Therefore, according to the grommet assembly 10C of the fourth embodiment in which the grommet 5 is mounted on the inner member 1C, the first pressing support portion (pressing support portion) 45Ca of the first protruding part (protruding member) 4Ca provided to protrude on the rear side of the body portion 13C and the body portion 23C in the inner member 1C, and the second pressing support portion (pressing support portion) 45Cb of the second protruding part (protruding member) 4Cb are disposed along the inner surface of the ceiling 54a of the wire housing portion 53 in the grommet 5.

Therefore, when mounting the grommet assembly to the panel, the ceiling 54a of the wire housing portion 53 is pressed from above with a finger, so that the inner surface of the ceiling 54a in the elastically deformed wire housing portion 53 comes into contact with the second pressing support portion 45Cb of the second protruding part 4Cb, and the pressing force is transmitted to the first protruding part 4Ca through the first pressing support portion 45Ca. That is, the pressing force applied by the operator on the grommet assembly is reliably transmitted to the panel engagement portions 25 of the body portion 13C and body portion 23C through the first protruding part 4Ca and the second protruding part 4Cb.

Therefore, the panel engagement portions 25 can be reliably engaged with the opening edge 106 of the mounting hole 105 by pressing the ceiling 54a of the wire housing portion 53 with a finger. Therefore, similar to the grommet assembly 10 of the first embodiment, the grommet assembly 10C according to the fourth embodiment can be easily mounted to the panel 100 regardless of the panel shape of a mounting position.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims. The inner members 1, 1A, 1B, and 1C according to the respective embodiments include a plurality of fix portions 17 for fixing the connectors 31, and a plurality of separately configured connectors 31 are integrally combined to form a multipolar connector as a whole. The inner member of the present invention is not limited to such a configuration, and can be configured, for example, to be mounted onto a multipolar connector.

According to the exemplary embodiments described above, a grommet assembly (10, 10C) includes an inner member (1, 1A, 1B, 1C) having a body portion (e.g., the body portion 13, 13A, 13B, 13C and the body portion 23, 23A, 23B, 23C) to be inserted into a mounting hole (105) of a panel (100), and a panel engagement portion (25) formed on the body portion and configured to be engaged with an opening edge (106) of the mounting hole, a grommet (5) configured to be mounted to a rear side of the inner member, the grommet including an annular panel contact portion (51) having a seal part (57) configured to contact a surface of a portion (107) of the panel (100) surrounding the mounting hole, and a tubular wire housing portion (53) connected to the panel contact portion and configured to cover an electric wire (e.g., the wire harness 33) such that the electric wire is bent with respect to a center axis (X) of the mounting hole, and a protruding member (4, 4A, 4Ba:4Bb, 4Ca:4Cb) provided to protrude from a rear side of the body portion, the protruding member including a pressing support portion (45, 45A, 45Ba:45Bb, 45Ca:45Cb) extending along an inner surface (e.g., the inner surface of the ceiling 54a) of the wire housing portion.

The inner member may further include a flange portion (15) protruding from an outer periphery of the rear side of the body portion (e.g., the body portion 13, 13A, 13B, 13C and the body portion 23, 23A, 23B, 23C), and the panel contact portion may further have a flange fitting groove (52) on an inner periphery of the panel contact portion (51) and into which the flange portion is inserted.

The body portion (e.g., the body portion 13, 13A, 13B, 13C and the body portion 23, 23A, 23B, 23C) may have an oval tubular shape to be fitted into the mounting hole (105), the body portion having opposed walls defining an oval opening (20) of the body portion, the protruding member (4, 4Ba:4Bb, 4Ca:4Cb) may have an arch shape protruding from the opposed walls so as to bridge the oval opening of the body portion in a lateral direction perpendicular to a longitudinal direction of the oval opening of the body portion, and may be disposed at a central position on the body portion with respect to the longitudinal direction of the oval opening of the body portion.

What is claimed is:

1. A grommet assembly comprising:
    an inner member comprising a body portion to be inserted into a mounting hole of a panel, and a panel engagement portion formed on the body portion and configured to be engaged with an opening edge of the mounting hole;
    a grommet configured to be mounted to a rear side of the inner member, the grommet comprising an annular panel contact portion having a seal part configured to contact a surface of a portion of the panel surrounding the mounting hole, and a tubular wire housing portion connected to the panel contact portion and configured to cover an electric wire such that the electric wire is bent with respect to a center axis of the mounting hole; and
    a protruding member provided to protrude from a rear side of the body portion, the protruding member comprising a pressing support portion extending along an inner surface of a rear wall of the wire housing portion,
    wherein the body portion has an oval tubular shape to be fitted into the mounting hole, the body portion comprising opposed walls defining an oval opening of the body portion, and
    wherein the protruding member has an arch shape protruding from the opposed walls so as to bridge the oval opening of the body portion in a lateral direction perpendicular to a longitudinal direction of the oval opening of the body portion, and is disposed at a central position on the body portion with respect to the longitudinal direction of the oval opening of the body portion.

2. The grommet assembly according to claim 1,
    wherein the inner member further comprises a flange portion protruding from an outer periphery of the rear side of the body portion, and
    wherein the panel contact portion further has a flange fitting groove on an inner periphery of the panel contact portion and into which the flange portion is inserted.

* * * * *